(12) United States Patent
Campbell et al.

(10) Patent No.: US 10,688,948 B2
(45) Date of Patent: Jun. 23, 2020

(54) AUTOMOTIVE VEHICLE BUMPER ASSEMBLY

(71) Applicant: Tiercon Corp., Toronto (CA)

(72) Inventors: Christopher Campbell, Vineland, CA (US); Mihai Cioranic, Cambridge (CA); Adam Bird, Hamilton (CA)

(73) Assignee: Tiercon Corp, Toronto, Ontario (CA)

( * ) Notice: Subject to any disclaimer, the term of this patent is extended or adjusted under 35 U.S.C. 154(b) by 141 days.

(21) Appl. No.: 15/662,765

(22) Filed: Jul. 28, 2017

(65) Prior Publication Data

US 2018/0029550 A1     Feb. 1, 2018

Related U.S. Application Data

(60) Provisional application No. 62/367,664, filed on Jul. 28, 2016, provisional application No. 62/429,939, filed on Dec. 5, 2016.

(51) Int. Cl.
| | |
|---|---|
| *B60R 19/18* | (2006.01) |
| *B60R 19/26* | (2006.01) |
| *B60R 19/34* | (2006.01) |
| B60R 19/00 | (2006.01) |

(52) U.S. Cl.
CPC .............. *B60R 19/18* (2013.01); *B60R 19/26* (2013.01); *B60R 19/34* (2013.01); *B60R 19/00* (2013.01); *B60R 2019/1806* (2013.01)

(58) Field of Classification Search
CPC ......... B60R 19/03; B60R 19/18; B60R 19/24; B60R 19/34; B60R 19/26
USPC ......................................... 296/120, 221, 102
See application file for complete search history.

(56) References Cited

U.S. PATENT DOCUMENTS

| | | | | |
|---|---|---|---|---|
| 6,139,044 A | * | 10/2000 | Smith ..................... | B60D 1/247 280/500 |
| 6,709,036 B1 | * | 3/2004 | Evans ...................... | B60D 1/52 224/521 |
| 10,029,634 B1 | * | 7/2018 | Diaz ........................ | B60R 19/18 |
| 2003/0173787 A1 | * | 9/2003 | Zipfel ..................... | B60R 19/26 293/102 |
| 2003/0227184 A1 | * | 12/2003 | Evans ...................... | B60D 1/52 293/120 |
| 2004/0094975 A1 | * | 5/2004 | Shuler .................... | B60R 19/18 293/120 |
| 2006/0255602 A1 | * | 11/2006 | Evans .................... | B60R 19/18 293/120 |

(Continued)

*Primary Examiner* — Jason S Morrow
(74) *Attorney, Agent, or Firm* — Miller Canfield

(57) ABSTRACT

A bumper assembly is provided having a flange that overlies the body of the vehicle. The flange may be a body flange extending from an elongate bumper beam or a cladding flange extending from an external cladding that covers at least a portion of the bumper beam. The flange may protect the body from wear or corrosion, and/or bridge a gap between the frame and the body of the vehicle. The assembly may also include a contact structure for contacting at least a portion of the vehicle frame, such as the hitch beam. The contact structure may resist rotation of the bumper assembly, prevent vibration of the bumper assembly against the frame, and/or support a vertical load on the bumper. In some embodiments, the assembly may be primarily mounted to the body of the vehicle, such that the bumper beam "hangs" from the body of the vehicle.

40 Claims, 11 Drawing Sheets

(56) References Cited

U.S. PATENT DOCUMENTS

| | | | |
|---|---|---|---|
| 2007/0236049 A1* | 10/2007 | Chapman | B62D 25/087 296/193.08 |
| 2008/0143125 A1* | 6/2008 | Nees | B60D 1/485 293/117 |
| 2008/0277950 A1* | 11/2008 | Nees | B60R 19/48 293/106 |
| 2010/0127533 A1* | 5/2010 | Gonin | B60R 19/12 296/193.09 |
| 2013/0249246 A1* | 9/2013 | Kitaizumi | B60R 19/12 296/187.09 |
| 2013/0307281 A1* | 11/2013 | Birka | B60R 19/03 293/120 |
| 2013/0307291 A1* | 11/2013 | Suzuki | B60R 3/00 296/209 |
| 2016/0137158 A1* | 5/2016 | Du | B60R 19/04 293/133 |
| 2017/0050551 A1* | 2/2017 | Smith | B60R 11/04 |
| 2018/0141512 A1* | 5/2018 | Munjurulimana | B60R 19/18 |
| 2018/0215331 A1* | 8/2018 | Gumpina | B60R 19/18 |
| 2019/0161040 A1* | 5/2019 | Davenport | F16B 5/0664 |

* cited by examiner

AUTOMOTIVE VEHICLE BUMPER ASSEMBLY

CROSS-REFERENCE TO RELATED APPLICATIONS

This application claims priority to United States Provisional Application Nos. 62/367,664 and 62/429,939 filed on Jul. 28, 2016 and Dec. 5, 2016, respectively, which are herein incorporated by reference.

BACKGROUND OF THE INVENTION

1. Field of the Invention

This invention relates to automotive vehicle bumper assemblies.

2. Description of Related Art

Automotive vehicles include bumper assemblies for absorbing major and minor collisions between the vehicle and other objects. A bumper assembly typically includes a reinforcing beam, often made of metal, which is in turn mounted to the frame of the vehicle.

Concerns over fuel economy have pressured auto manufacturers to reduce the weight of all components, including bumper assemblies. One solution has been the introduction of composite bumper assemblies, which replace metal beams with lighter composite materials, such as reinforced plastics, metal matrix composites, carbon fibre materials, and the like. The use of such composites can significantly reduce the overall weight of the bumper assembly, which in turn contributes to improved fuel economy.

Nevertheless, the auto industry has been reluctant to adopt composite bumper assemblies. Although the initial crash protection of a composite bumper assembly can be as good as or better than its metal equivalent, composite bumper assemblies can experience higher failure rates in post-impact scenarios.

More specifically, composite bumper assemblies can be prone to cracking after an initial impact, even if relatively minor in nature. Repeated stress on the bumper through secondary impacts or day-to-day usage can cause these cracks to propagate, ultimately resulting in the bumper falling away from the vehicle. This is in contrast to metal bumper assemblies, which tend to be more ductile and hence more resistant to cracking and/or crack propagation.

In addition, the impact zones of conventional bumper assemblies (whether or not they are of composite construction) tend to be concentrated at discrete points along the length of the bumper, often at only two points which also serve as the primary attachment point to the vehicle. This concentration of forces at the primary attachment points of the bumper assembly can increase the likelihood of failure after a primary impact, when the bumper is later subjected to step loads, secondary impacts, or other forms of regular use.

Vehicles having a body-on-frame construction, such as pickup trucks, SUVs, full-size vans, transport trucks, and the like also tend to have gaps between the bumper assembly and the vehicle body. For example, there is often a gap between the bumper assembly and the box of a pickup truck (See: FIG. 1, reference numeral 20). Likewise, a cargo van may also have a gap between the bumper assembly and the bottom edge of the hatch opening.

Maintaining the consistency of such gaps during vehicle assembly is often challenging. It is also desirable to conceal such gaps, from an aesthetic standpoint. Heavy use of the vehicle for loading and unloading materials, particularly loose or bulk materials, may also cause excessive wear or corrosion of the vehicle body along such gaps, such as at the leading edge of the bottom of a pickup truck box. This can result in the collection of debris in pinch welds and other structural junctions in the body.

It is desirable to provide a lightweight composite bumper assembly which is more resistant to failure in post-impact scenarios. It is also desirable to provide a bumper assembly which increases the consistency of vehicle assembly, conceals assembly gaps on body-on-frame vehicles, and/or protects portions of the vehicle body which are subject to wear or corrosion.

SUMMARY OF THE INVENTION

The present invention provides a bumper assembly having a flange, which overlies the body of the vehicle. In some embodiments, the flange is a body flange that extends from an elongate bumper beam. In other embodiments, the flange is a cladding flange that extends from an external cladding that covers at least a portion of the bumper beam. In either case, the body flange or cladding flange may extend along an opening of the body of the vehicle, protect the body from wear or corrosion, and/or bridge a gap between the frame and the body of the vehicle.

A contact structure is also provided, which contacts at least a portion of the vehicle frame, such as the hitch beam. The contact structure may provide additional support, so as to resist rotation of the bumper assembly, prevent vibration of the bumper assembly against the frame, and/or to support a vertical (e.g. step) load on the bumper. The contact structure may in some cases be integral to the bumper beam. The contact structure may be a continuous surface or a plurality of projections, such as closely spaced ribs or the like.

Additional components of the assembly may also be provided in some embodiments as discussed further below, such as frame mounts, hitch mounts, or various surfaces of the contact structure. The vehicle may be of body-and-frame construction or unibody construction.

The bumper assembly may be primarily mounted to the body of the vehicle, such that the bumper beam "hangs" from the body of the vehicle. In other embodiments, the bumper assembly is primarily mounted to the frame of the vehicle.

In one broad aspect, there is provided a bumper assembly for attachment to a vehicle having a body and a frame, the bumper assembly comprising: an elongate bumper beam; at least one body flange disposed along the length of the bumper beam, the at least one body flange configured to overlie the body of the vehicle; and at least one contact structure disposed on an inner surface of the bumper beam, for contacting a portion of the frame of the vehicle.

One or more attachment points may be provided on the body flange for attachment to the body of the vehicle. In some embodiments, the body flange is integral to the bumper beam and/or extends across at least 50% of the length of the bumper beam. In some cases, a cladding flange may also be provided to overlie the body flange.

In another broad aspect, there is provided a bumper assembly for attachment to a vehicle having a body and a frame, the bumper assembly comprising: an elongate bumper beam; at least one contact structure disposed on an inner surface of the bumper beam, for contacting a portion of the frame of the vehicle; and a cladding having at least one cladding flange that extends from the cladding and is configured to overlie the body of the vehicle. In some embodiments, the cladding flange extends across at least 50% of the length of the bumper.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Referring to the figures, wherein like numerals indicate like or corresponding parts throughout the several views, a bumper assembly 100 according to various embodiments of the invention are shown.

Figure 1:
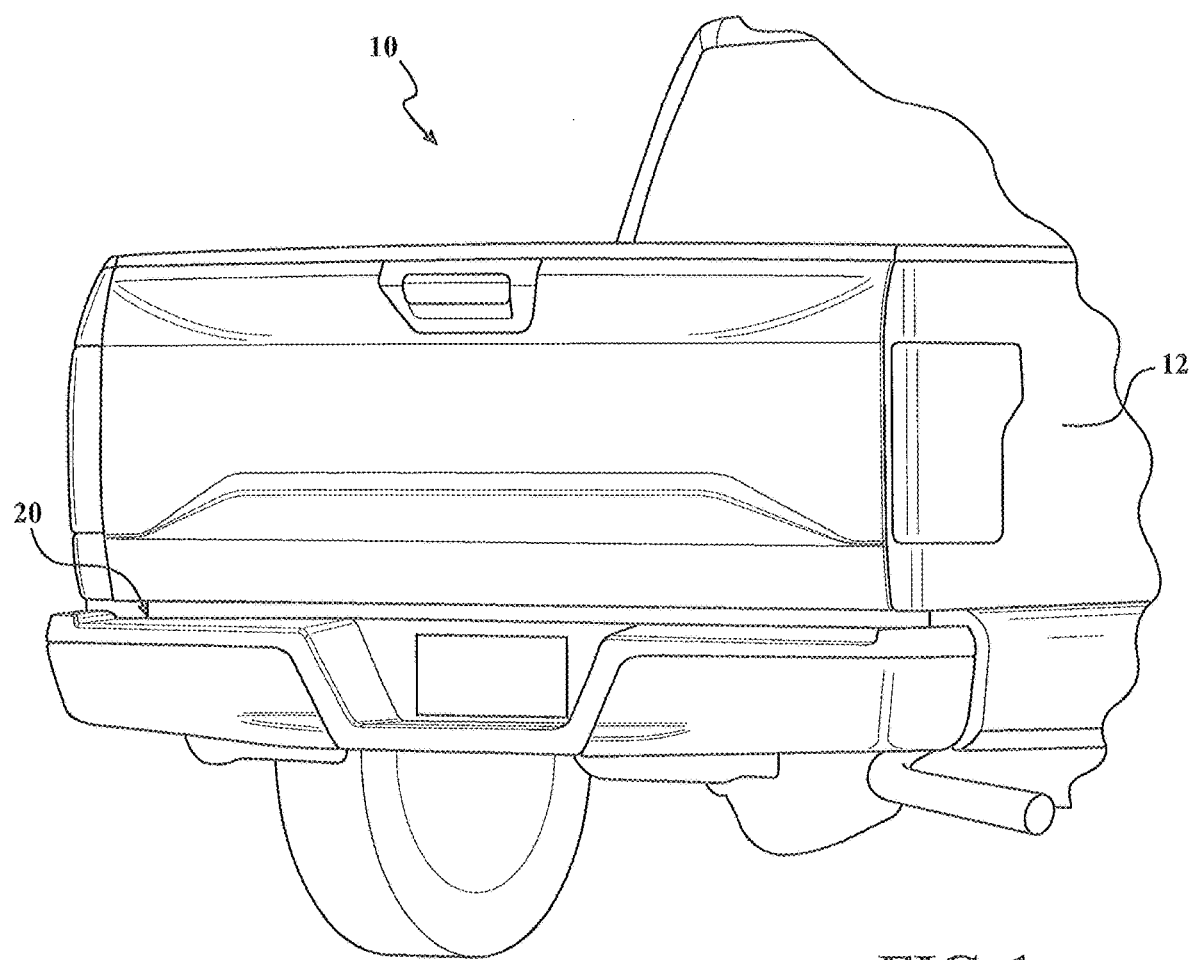
FIG. 1 is a perspective view of a bumper assembly according to the prior art, mounted on a vehicle.
Figure 2:
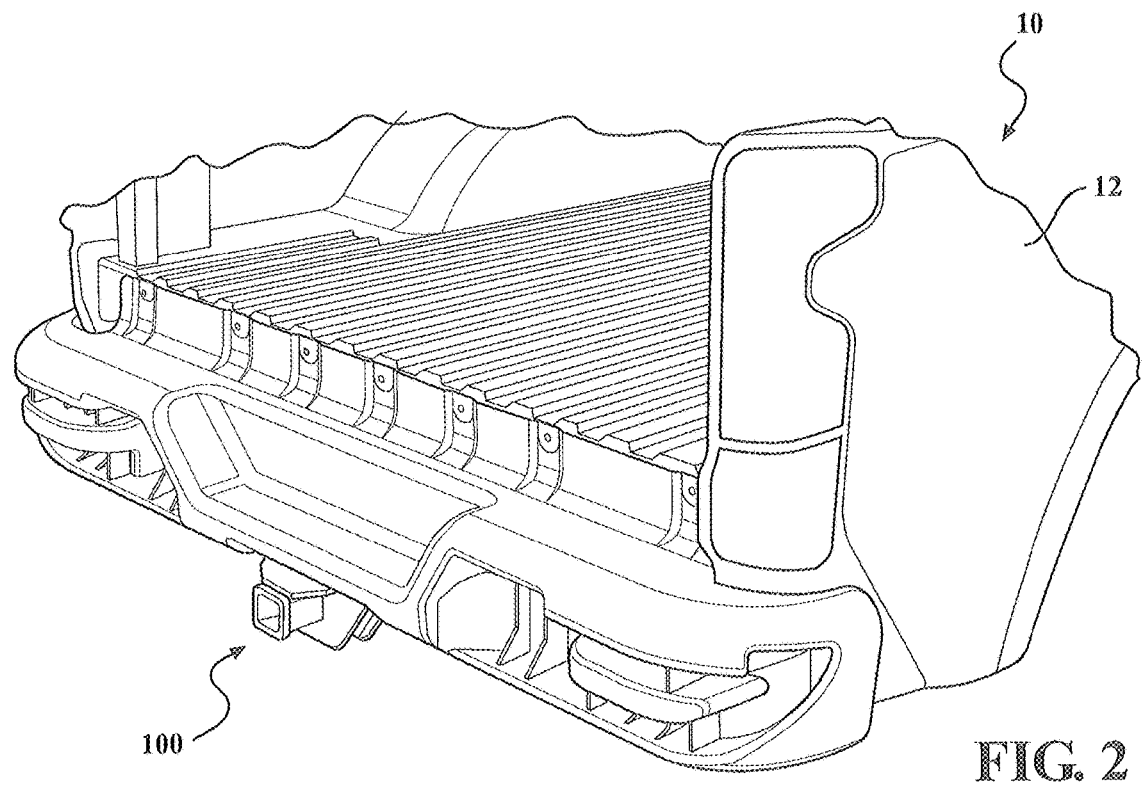
FIG. 2 is a perspective view of a bumper assembly according to an embodiment of the invention, mounted on a vehicle.
Figure 3:
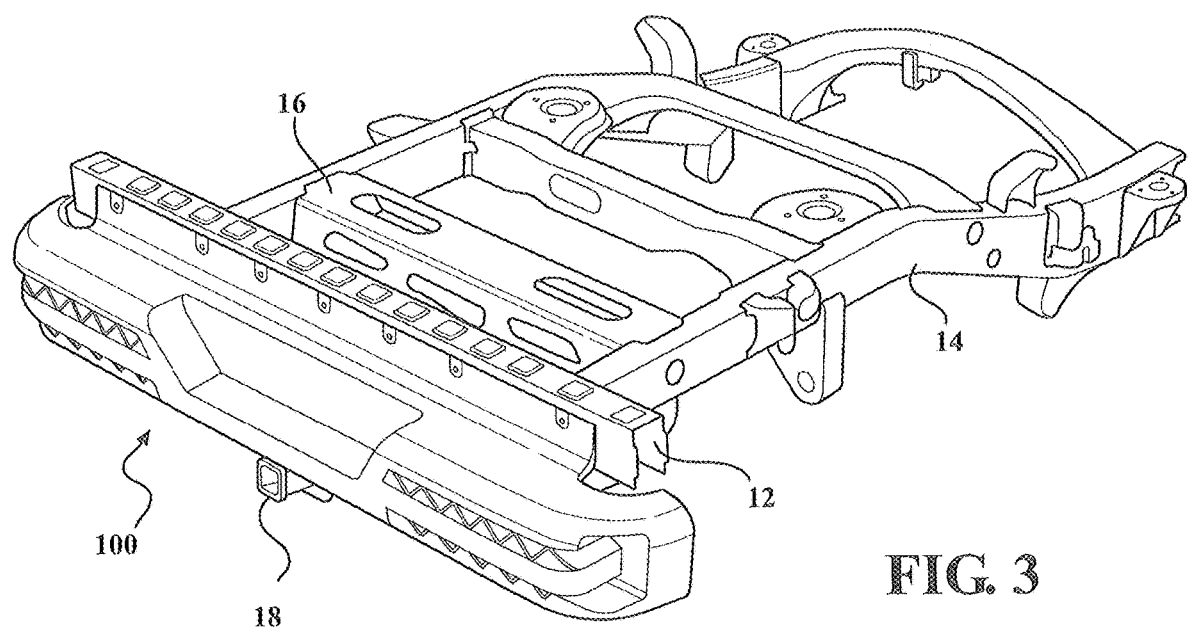
FIG. 3 is a perspective view of the bumper assembly of FIG. 2, in which the body of the vehicle has been partly broken away.

The vehicle 10 may be of various types, including cars, trucks, SUVs, vans, and other automotive vehicles. In some embodiments, the vehicle 10 has a body-on-frame construction, such as the pickup truck shown in FIGS. 1 and 2. In vehicles of such construction, the body 12 of the vehicle 10 is mounted to a ladder frame 14. The frame 14 may be of various configurations, and in the case of vehicles designed for towing, may include a hitch beam 16 subframe that provides structural support for a hitch 18.

In other embodiments, the vehicle 10 may be of unibody construction. In vehicles of such construction, the body 12 of the vehicle is integral with the frame 14, which together provide structural support for the vehicle 10 as a single unit. Such unibody frames 14 may be of various configurations, and in the case of vehicles designed for towing, may include a hitch beam 16 that provides structural support for a hitch 18.

Regardless of the construction of the vehicle, the hitch beam 16, when present, may be of various configurations, and may be constructed from square tubing, round tubing, or other suitable materials.

In the embodiment shown in FIGS. 3-6, the bumper assembly 100 is generally comprised of a bumper beam 102, a body flange 104, and a frame contact structure 106.

The bumper beam 102 serves as the main structural component of the assembly 100 and is designed to accept impacts from objects in the environment.

In preferred embodiments, the bumper beam 102 is manufactured from a lightweight and corrosion-resistant composite material. Many suitable composite materials are known in the art, including fibre-reinforced resins, carbon fibre materials, and the like. In some embodiments, the bumper beam 102 may be manufactured from non-composite materials such as metals or standard plastics or may include such components in overmolding arrangements, such as plastic-composite overmolding or metal-composite overmolding.

The shape and configuration of the bumper beam 102 will depend in part on the material chosen for its construction and the vehicle 10 to which it is to be applied. Various bumper beam 102 configurations are known in the art. In the embodiment shown in FIGS. 4-6, the bumper beam 102 is constructed from a fiber-reinforced resin, which is injection-molded into the configuration shown. The use of injection molding allows for considerable design flexibility, which allows for styling, sensor integration (RPA, FPA, and sonar) without the need for extra hardware or brackets.

The body flange 104 extends from the bumper beam 102 and overlies the body 12 of the vehicle 10. The body flange 104 may be provided as a single continuous flange (e.g. FIG. 2) or in non-continuous configurations in which the flange is provided in multiple portions along the length of the bumper beam 102.

Figure 4:
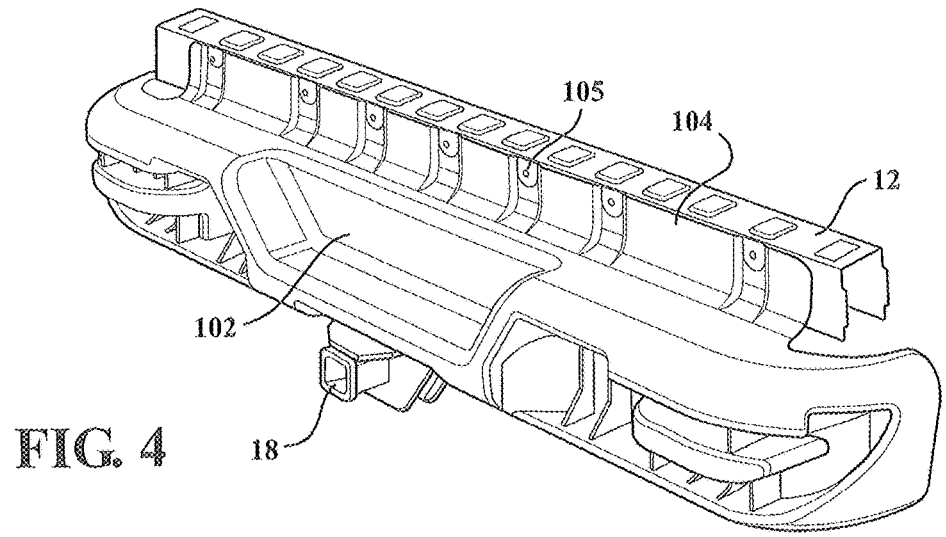
FIGS. 4-6 are enlarged perspective views of the bumper assembly of FIG. 2, as seen from the front (FIG. 4), rear (FIG. 5), and underside (FIG. 6).
Figure 5:
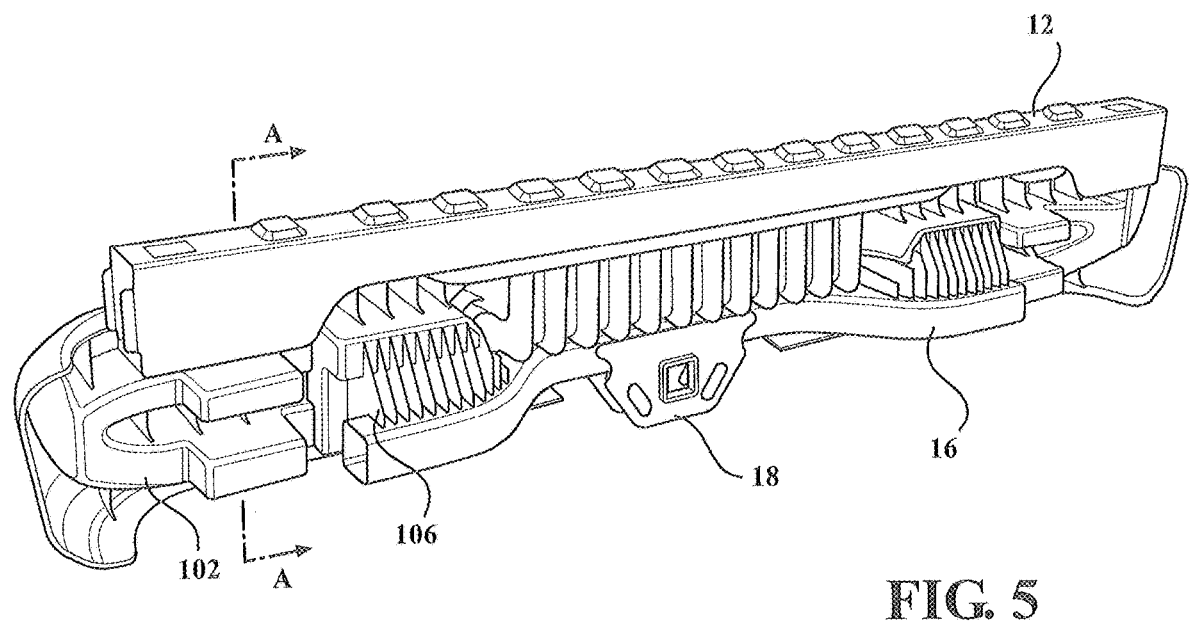
Figure 6:
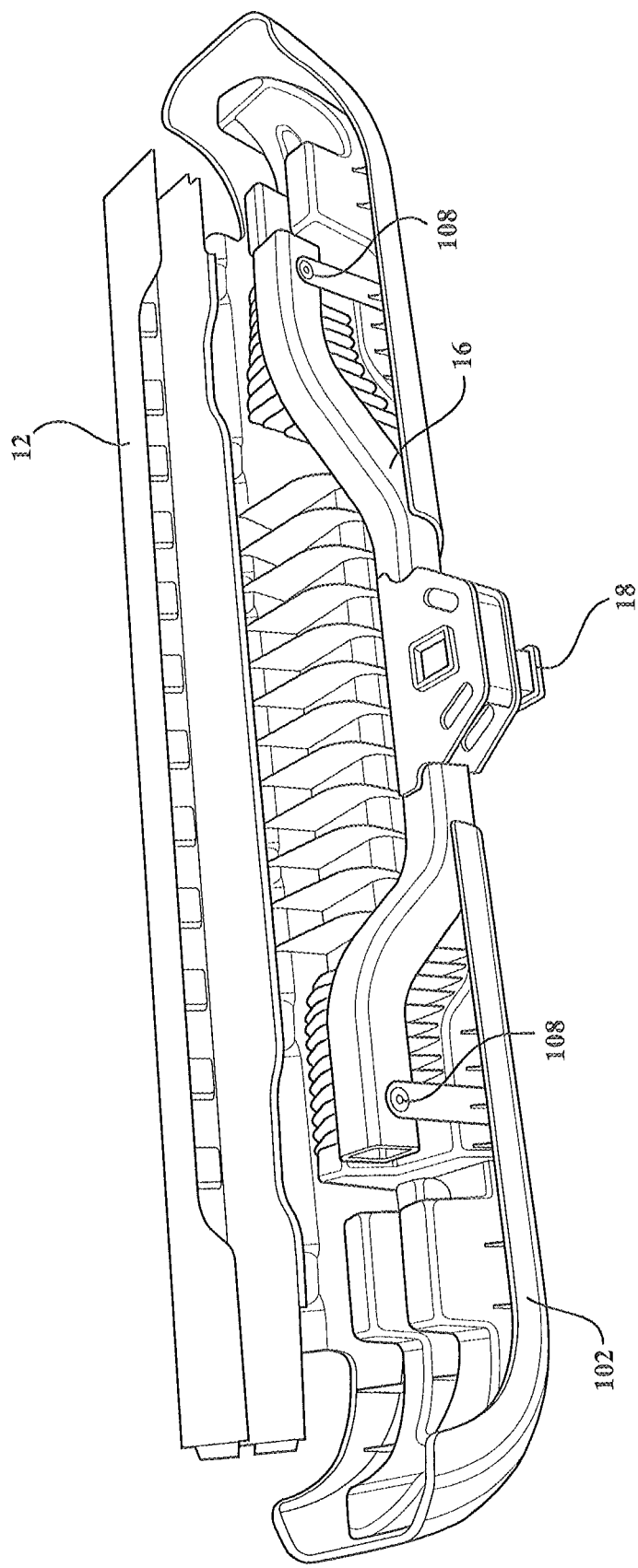
Figure 7:
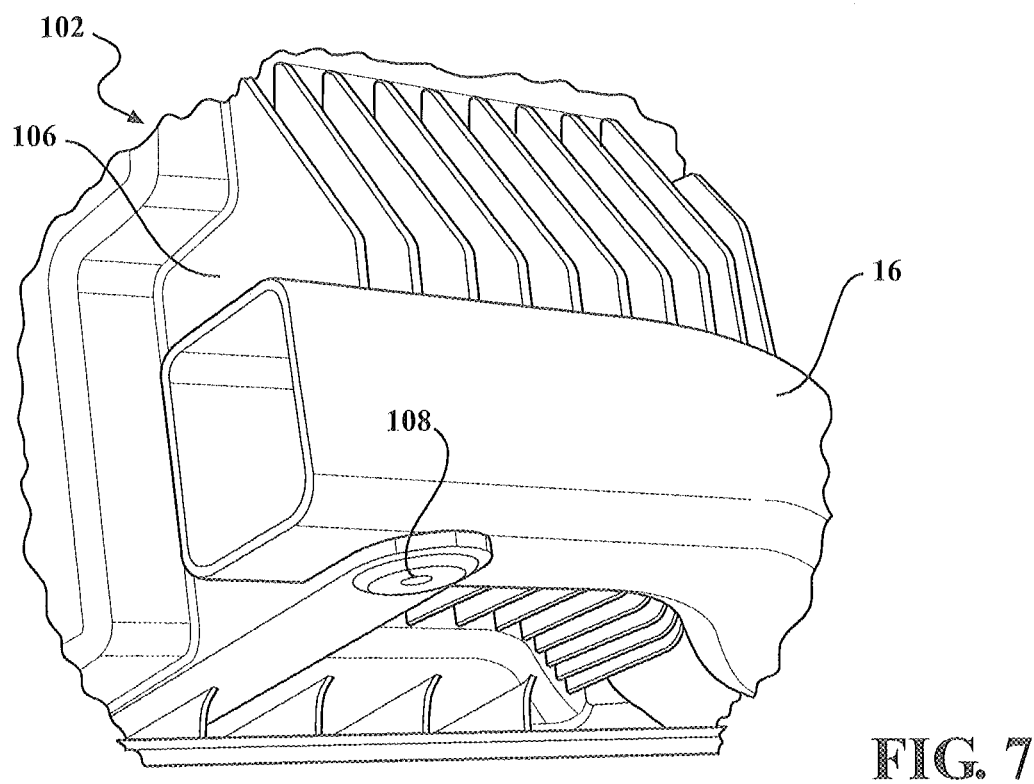
FIG. 7 is an enlarged view of a portion of the bumper assembly of FIG. 2.
Figure 8:
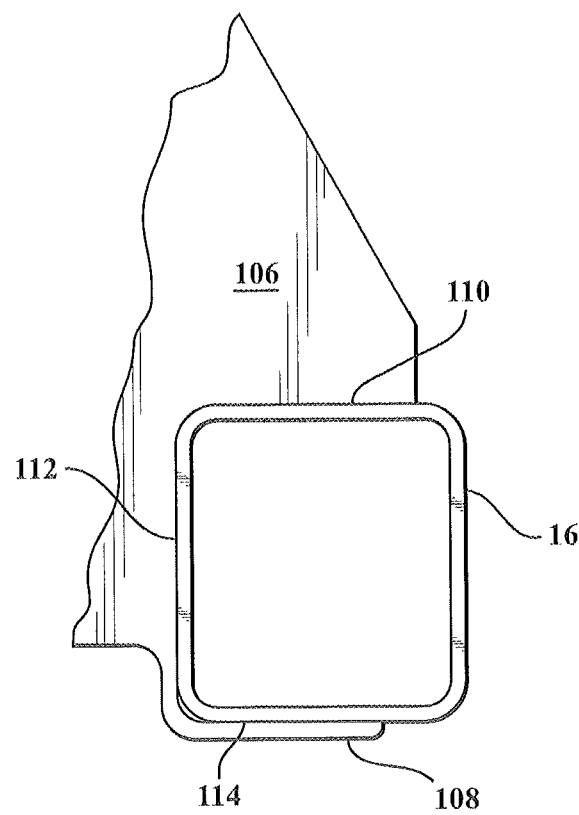
FIG. 8 is a cross-sectional view, partly broken away, of a portion of the bumper assembly in FIG. 7.

In the embodiment shown in FIGS. 4 to 6 the body flange 104 acts as the primary connection point to the vehicle 10, such that the bumper beam 102 is mounted to the body 12 of the vehicle 10 at a plurality of attachment points 105. Various other mounting arrangements are also discussed below.

Figure 9:
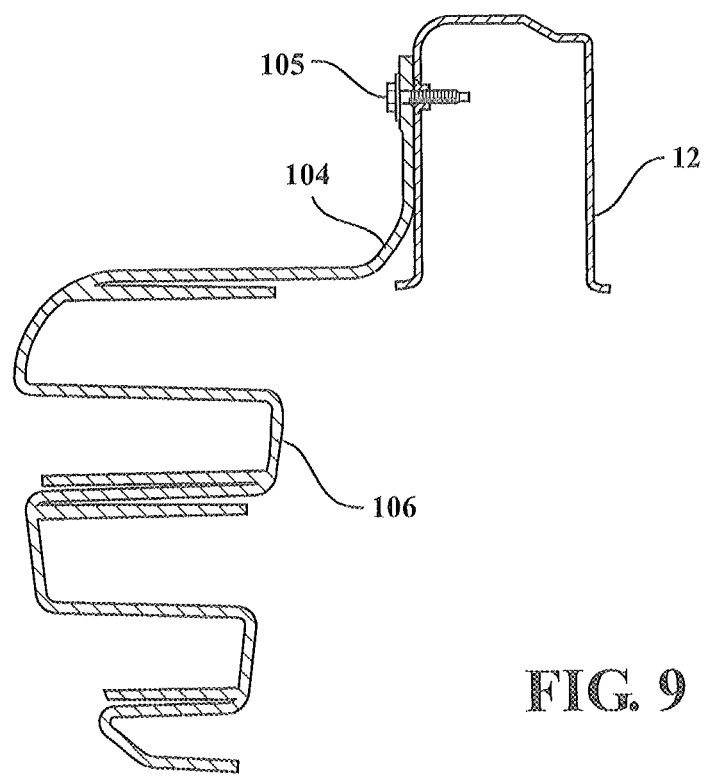
FIG. 9 is a cross-sectional view of the bumper assembly of FIG. 5, taken along line A-A.

As best seen in FIG. 9, this arrangement allows the bumper beam 102 to "hang" from the body 12 of the vehicle 10, which separates the portion of the bumper assembly 100 responsible for attachment to the vehicle 10 (i.e. attachment points 105) from the portion primarily responsible for absorbing and transmitting impact forces (i.e. contact structure 106). Thus, cracks that develop through ordinary use of the bumper assembly 100 are less likely to cause detachment from the vehicle 10.

In embodiments where the body flange 104 includes one or more attachment points 105, it may be desirable to have a "wide" flange 104 that extends across 50% to 100% of the width of the bumper beam 102. The use of a "wide" body flange 104, may improve resistance to cracking during a crash event, thereby reducing the likelihood of a subsequent failure of the bumper assembly. For example, in the embodiment shown in FIG. 1, the flange 104 extends across at least 80-90% of the width of the bumper section 102. Numerous other "wide" configurations would be apparent to the person of skill having regard to the present disclosure, including a dis-continuous flange comprised of several shorter flanges with a total cumulative length falling within the ranges described above.

The use of a "wide" body flange 104 may also add structural rigidity to the bumper beam 102. In embodiments where the bumper beam 102 is made of composite materials, this may also reduce twisting or warping during manufacture of the assembly 100. The use of a "wide" body flange 104 may also allow for multiple attachment points 105 to be provided across the body 12 of the vehicle 10, which may assist in the installation of the bumper assembly 100, by allowing the installer to compensate for twists, warps, or other imperfections in the bumper beam 102.

The body flange 104 may also be configured to protect the underlying vehicle body 12 against premature wear or corrosion. For example, in the embodiment shown in FIG. 2, the flange 104 seats flush along the bottom of the pickup truck box and extends across an opening (in this case the truck bed) in the body 12 of the vehicle 10. This arrangement may protect the pinch weld and the box of the vehicle 10 against damage from debris when the vehicle 10 is loaded and unloaded, as well as road salt and other causes of corrosion. In the case of vans and SUVs, the body flange 104 may protect the leading edge or front face of the cargo floor against damage during use. In any event, it may be desirable in such cases to use a "wide" body flange 104 of the type described above, to provide adequate coverage of the body 12.

In some embodiments, the body flange 104 is integral to the bumper beam 102, which may be useful in controlling gap formation during assembly of body-on-frame vehicles 10.

It is not uncommon for a visual gap 20 (FIG. 1) to exist between the bumper assembly 100 of the vehicle 10 and the vehicle body 12. In conventional construction, the bumper assembly and the body 12 are each independently attached to the frame 14 using brackets. Misalignment of either set of brackets can result in a loss of quality control regarding the spacing of the gap 20, due to stacked tolerances. The use of a body flange 104 that is integral to the bumper beam 102 reduces, or in some cases eliminates, the use of brackets for the bumper assembly 100, thereby increasing consistency in the assembly of the vehicle. In any event, the body flange 104 may also conceal the gap 20, thereby improving quality control.

The body flange 104 may also be configured for aesthetic appeal, so as to provide a cosmetic improvement to the vehicle 10 by covering the gap 20. For example, various ornamental features may be incorporated in the flange 104, such as patterns, textures, or manufacturer's logos.

Referring now to FIGS. 4 to 8, the frame contact structure 106 serves to transmit crash forces from the bumper beam 102 to the frame 14 of the vehicle. In some embodiments, the contact structure 106 is configured to absorb a portion of the crash forces through elastic deformation. The use of a continuous contact structure 106, or a plurality of closely spaced contact structures 106, extending across the width of the frame 14, or a substantial portion thereof, allows for broader and more consistent impact zones, which in turn may lessen the likelihood of cracking composite materials during minor impacts.

In preferred embodiments, the contact structure 106 extends across at least 25% of the width of the bumper beam 102. Numerous embodiments are contemplated within these ranges. For example, in the embodiment shown in FIG. 4, the contact structure 106 extends across at least 40-60% of the width of the bumper beam 102. In other embodiments, the contact structure may extend across 60-80% of the length of the bumper beam.

In some embodiments, the contact structure(s) 106 are in contact with the hitch beam 16 of the frame 14. For example, the contact structure 106 in FIGS. 7-8 comprises a top 110, a front 112, and an underside 114, all of which are in contact with the hitch beam 16 of the frame 14. The top 110 receives step loads and other vertical forces, which are transmitted to the hitch beam 16. The front 112 is primarily responsible for transmitting crash forces to the frame 14. The underside 114 resists rotation of the bumper beam 102. In other embodiments, the contact structure(s) 106 may comprise only a front surface 112, only a top surface 110, only an underside surface 114, or various combinations thereof.

The contact between the bumper beam 102 and the frame 14 may be fixed or slidable, as required for the application. For example, the assembly in FIG. 7 includes a pair of hitch mounts 108, which fasten portions of the contact structure 106 to the hitch beam 16 so as to minimize vibration of the assembly 100 against the hitch beam 16 and to further resist lateral or rotational movement of the bumper assembly 100 relative to the frame 14. In some embodiments, the hitch mounts 108 are integral to the bumper beam 102 whereas in other embodiments the hitch mounts 108 may be a separate component, such as a bracket or the like. Alternatively, in some applications it may be advantageous to allow the contact structure 106 to slide relative to the hitch beam 16 or other frame 14 components, to accommodate a certain degree of flex between the body 12 and the frame 14.

In the embodiment shown in FIGS. 5-8, the contact structures 106 are a plurality of closely spaced ribs, to reduce the overall weight of the assembly 100 and allow for greater elastic deformation during a crash event. Various other configurations would be apparent to the person of skill depending on the design requirements and manufacturing techniques. For example, in some embodiments, the impact structure 106 may be one continuous surface, a channel, a honeycomb arrangement, a series of pegs, or numerous other geometries.

Figure 10:
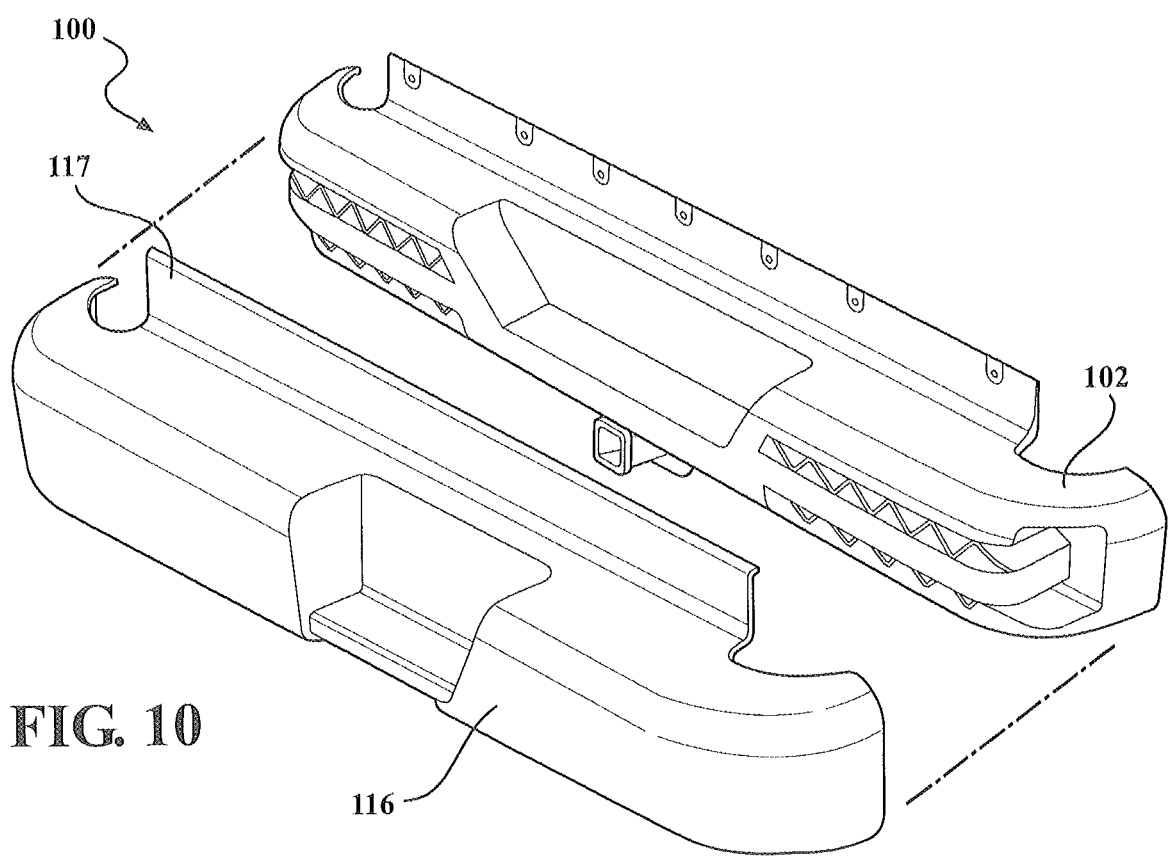
FIG. 10 is an exploded view of a bumper assembly according to an embodiment of the invention, in which the assembly includes an exterior cladding.
Figure 11A:
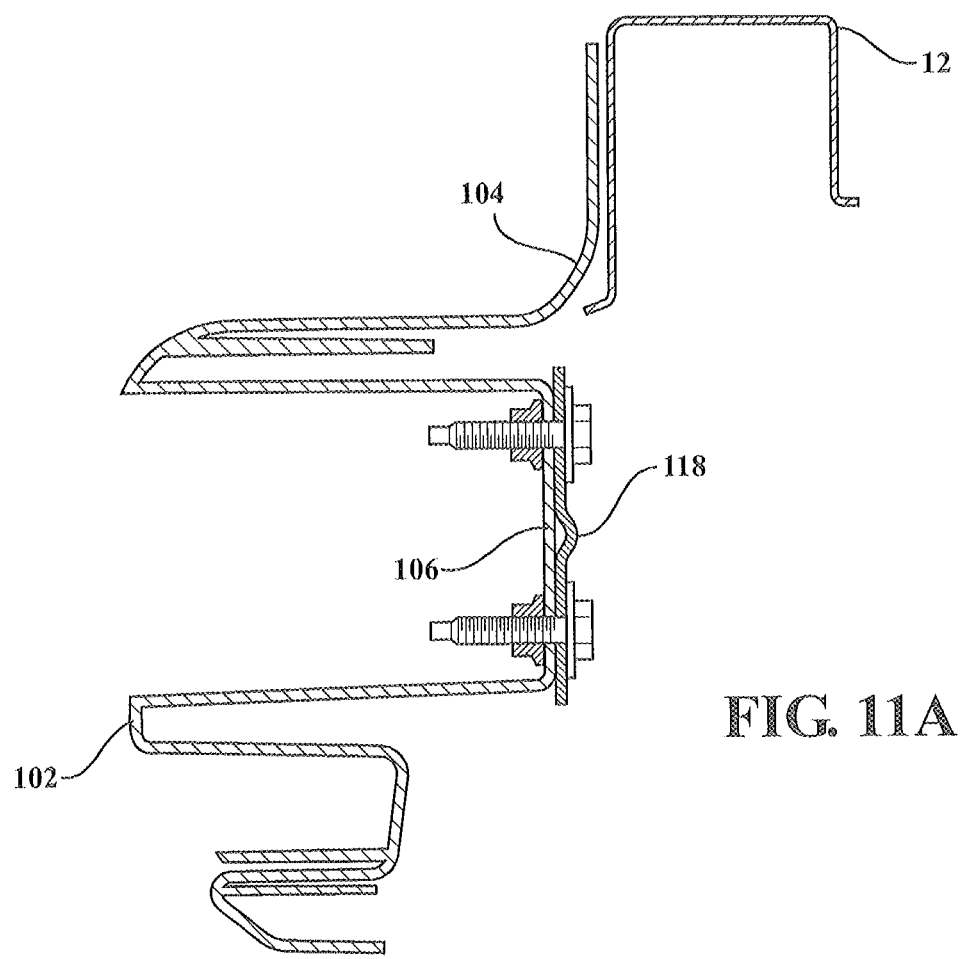
FIG. 11A is a cross-sectional view of an alternative embodiment of the bumper assembly of FIG. 5, taken along the same position as line A-A.
Figure 11B:
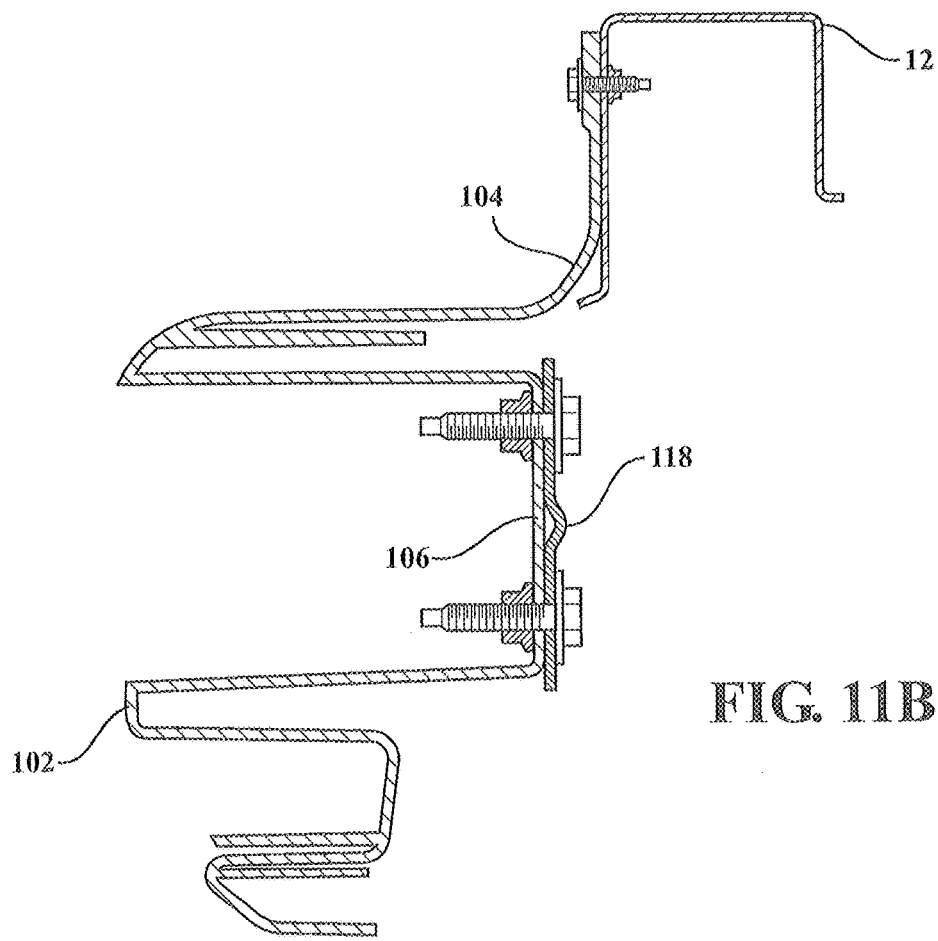
FIG. 11B is a cross-sectional view of yet another alternative embodiment of the bumper assembly of FIG. 5, taken along the same position as line A-A.
Figure 11C:
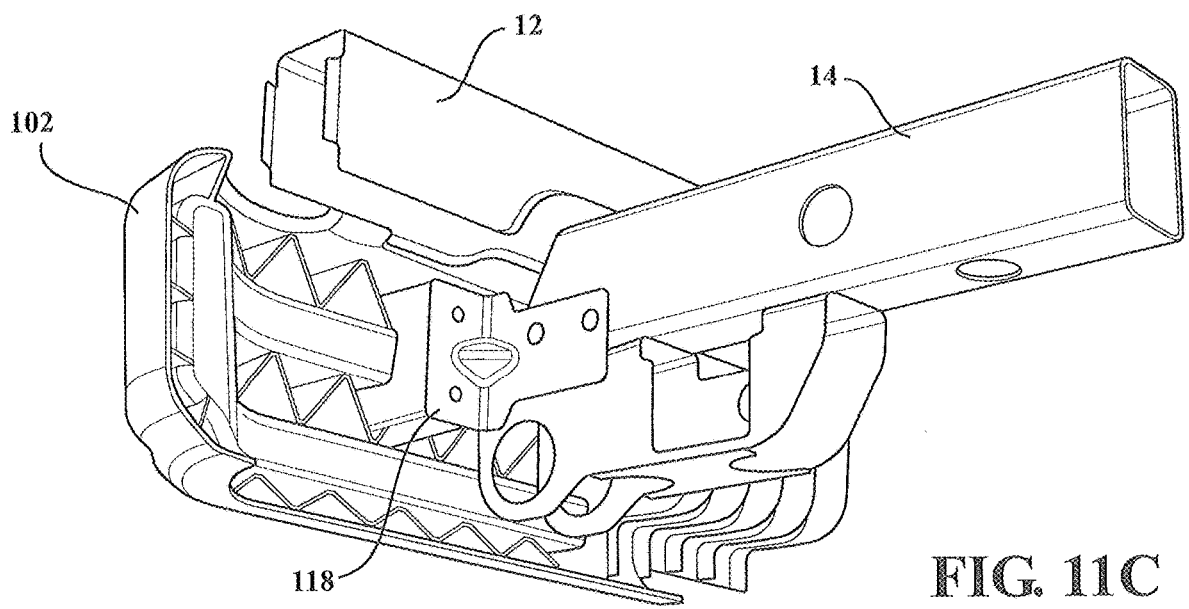
FIG. 11C is an enlarged perspective view of the bumper assembly of FIG. 11B.

Referring to FIG. 10, the bumper assembly 100 may also include a cladding 116, which fits over and is attached to the bumper beam 102. Such cladding 116 allows for a multitude of cosmetic changes to the bumper assembly 100, to reflect different options, trim levels, sensor packages, or model lines of the vehicle 10.

In some embodiments, the cladding includes a cladding flange 117, which extends from the cladding 116 and overlies either the body 12 of the vehicle or the body flange 104 of the bumper beam 102. In such arrangements, the cladding flange 117 may be in addition to, or in replace of, the body flange 104. In the embodiment shown in FIG. 10, the cladding flange 117 overlies the body flange 104, to protect the mounting points 105 and improve the overall aesthetic appeal of the bumper assembly.

Various materials can be used for the cladding 116 as appropriate, such as plastic, stainless steel, and aluminium. Likewise, numerous styling options are possible, such as chrome, painted surfaces, textured surfaces, mold-in-colour components, and the like. The cladding 116 may cover the entire bumper beam 102 (e.g. FIG. 9) or only a portion of the bumper beam 102, such as a step pad or the like.

Numerous variations are contemplated within the scope of the present invention.

For example, FIGS. 11A to 12D provide alternative embodiments in which a frame mount 118 directly mounts the bumper beam 102 to the frame 14, for added rigidity and/or support. The frame mounts 118 may be integral to the bumper assembly, or may be provided as separate components, such as brackets or the like. Where present, such frame mounts 118 may be in addition to, or in replace of, the hitch mount 108.

Likewise, in some embodiments, the frame mounts 118 may serve as a primary attachment point between the bumper assembly 100 and the vehicle 10. In such embodiments (e.g. FIG. 11A), the body flange 104 may overlie the body 12 without being directly attached thereto. In the event of a crash, the body flange 104 transmits a portion of the energy of the impact across the body 12, whereas the contact structure(s) transmits the balance of the energy of the impact across the frame 14. The body flange 104 in such embodiments may also serve to protect portions of the body 12 against wear or corrosion or close gaps 20, as described above.

FIGS. 12A to 12D depict another embodiment of the assembly 100. In this embodiment, the body flange 104 is omitted from the assembly 100 and the primary point of attachment to the vehicle 10 is the frame mounts 118, which in this embodiment are brackets which mount the bumper beam 102 to the frame 14. In an alternative embodiment, a body flange 104 may be provided as a separate component of the assembly 100, which attaches to the bumper beam 102 and overlies the body 12 so as to cover and protect the gap 20. An integral body flange 104 may also be included in some embodiments, in the manner discussed above (e.g. see FIG. 11A). A cladding flange 117 may also be used in replace of, or in addition to, a body flange 104 in a manner similar to FIG. 11A above. Likewise, the frame mounts 118 may be integral to the bumper beam 102, rather than being provided as brackets.

In the embodiment shown in FIGS. 12A to 12D, the contact structures 106 along the center of the bumper beam 102 also rest on the hitch beam 16 of the frame 14, in the manner described above, to improve crash performance, resist rotation of the bumper beam 102, and reduce cracking of the assembly 100.

Figure 12A:
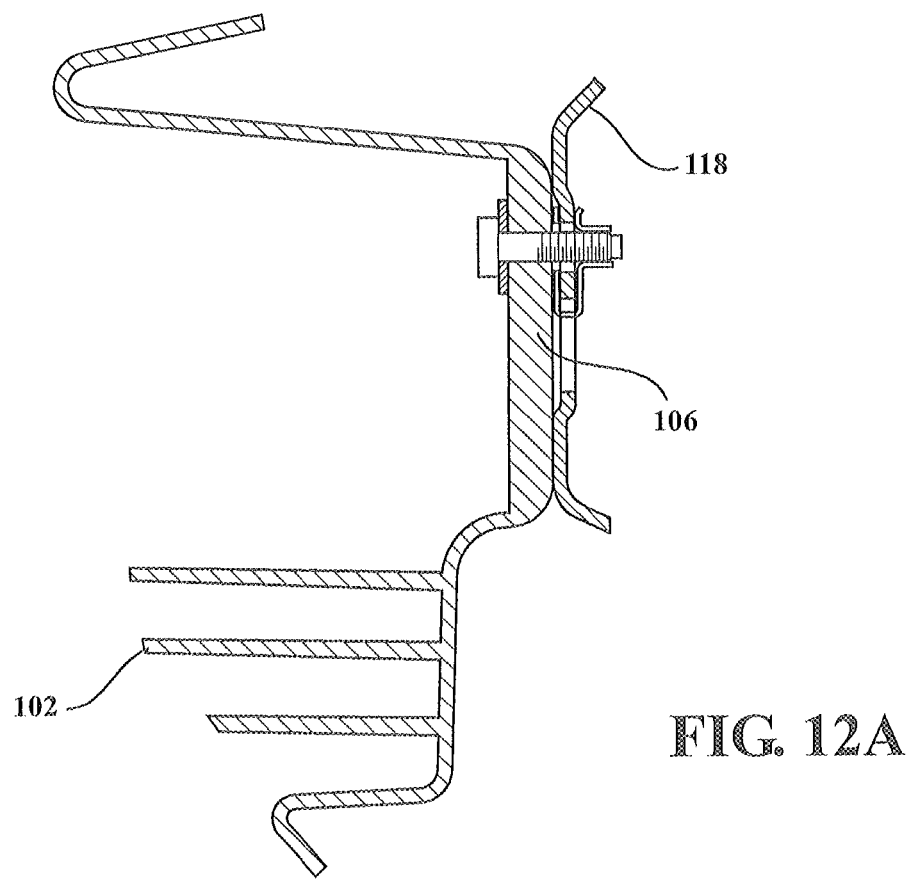
FIG. 12A is a cross-sectional view of an alternative embodiment of the bumper assembly of FIG. 5, taken along the same position as line A-A.
Figure 12B:
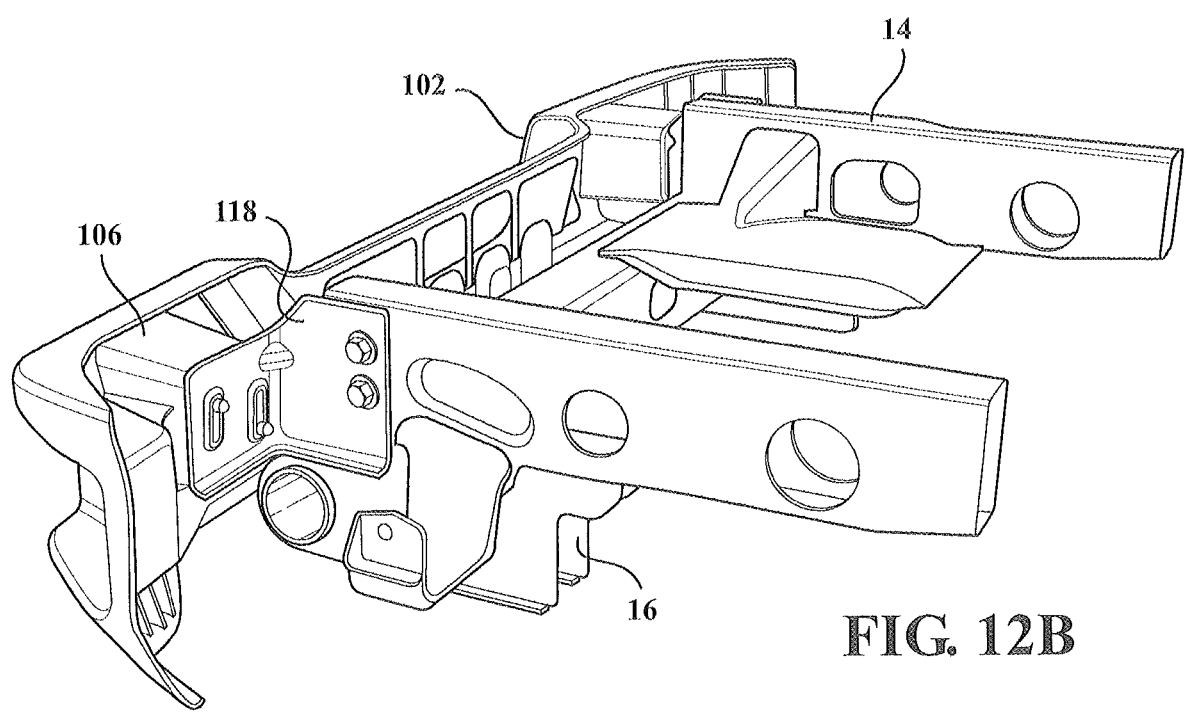
FIG. 12B is an enlarged rear perspective view of the bumper assembly of FIG. 12A.
Figure 12C:
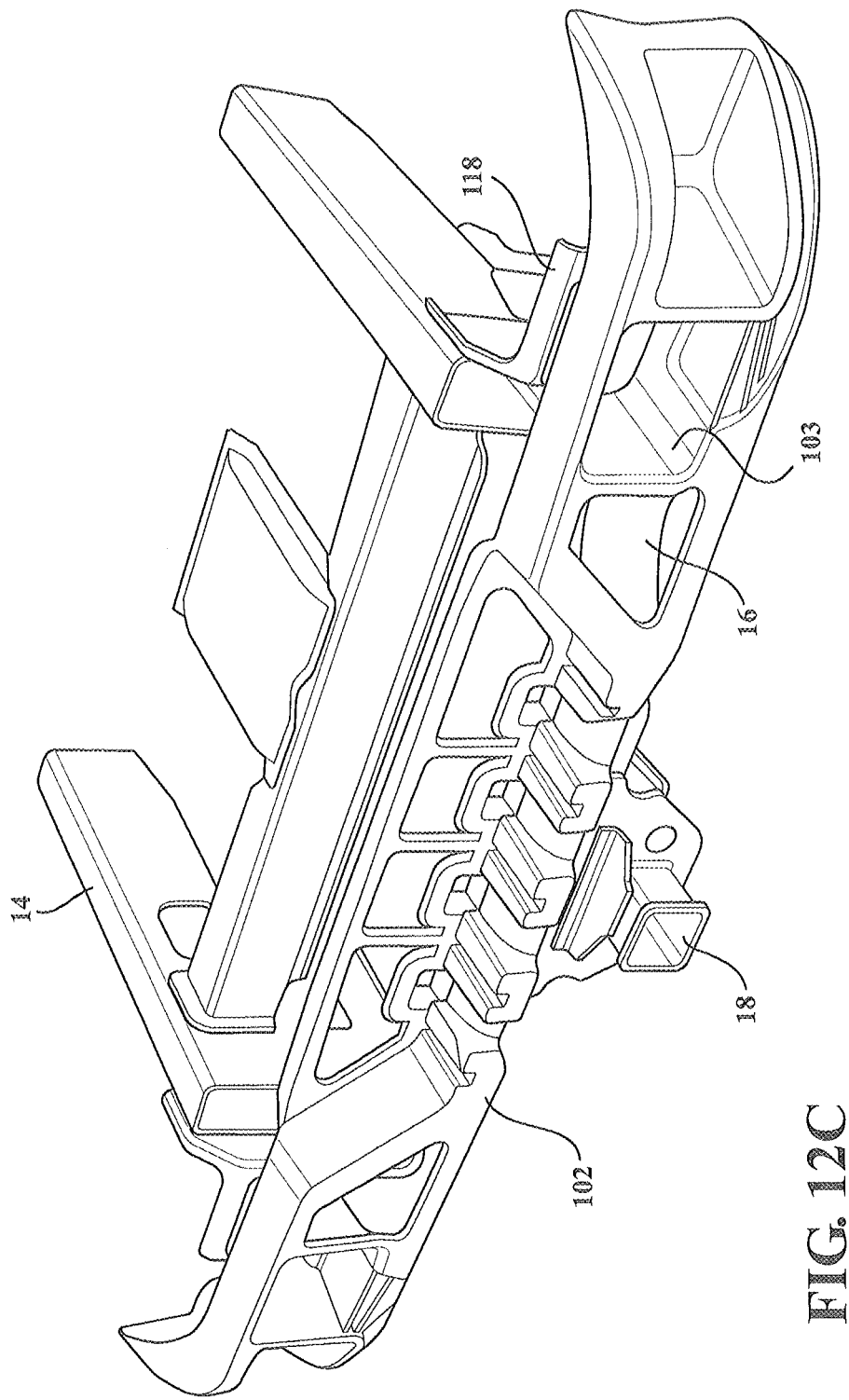
FIG. 12C is an enlarged front perspective view of the bumper assembly of FIG. 12A.
Figure 12D:
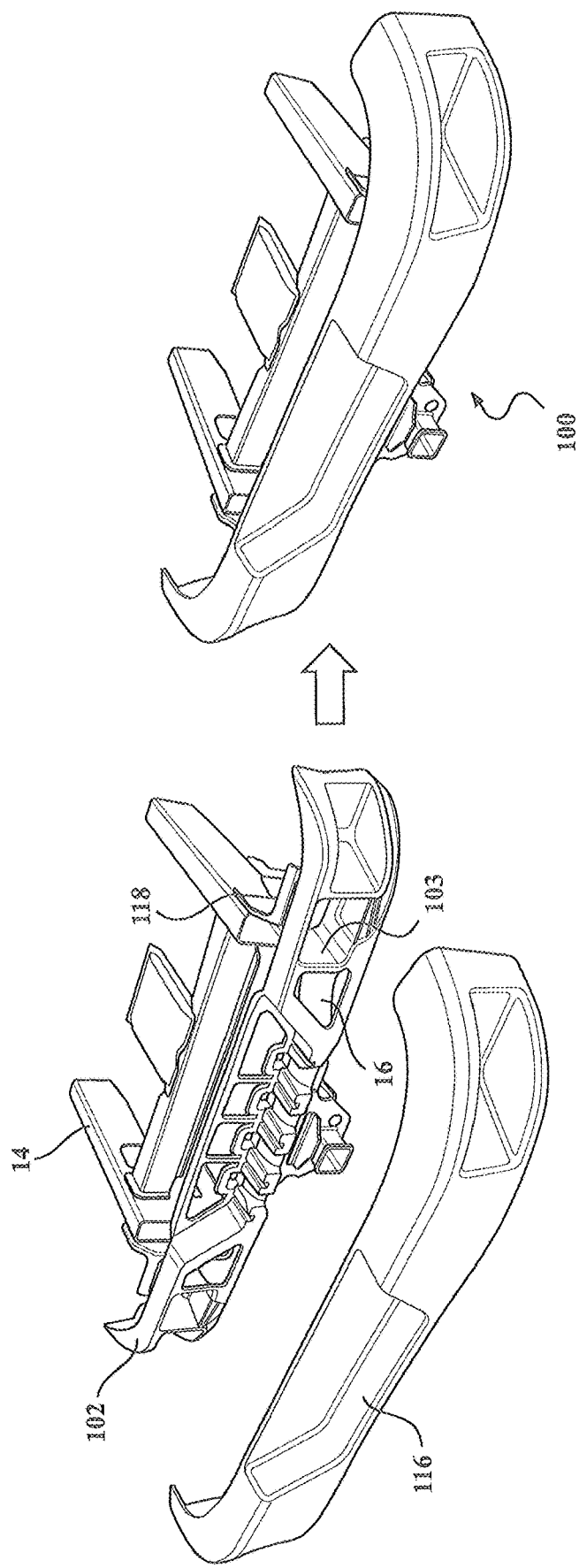
FIG. 12D is a perspective view of the bumper assembly of FIG. 12C, with a cladding.

Referring specifically to FIG. 12D, the bumper beam 102 and cladding 116 may also be configured to form one or more cavities 103 within the assembly 100. Such cavities 103 may provide integrated mounting points for parking sensors, backup cameras, and the like. For example, in some embodiments the bumper beam 102 is injection molded from a composite material and includes hardware attachment points for the sensors, cameras, or the like that are to be fitted within the cavity 103.

The bumper assembly 100 is installed by positioning the bumper beam 102 over the frame 14 (in this case, specifically the hitch beam 16). In embodiments which are mounted to the body 12 of the vehicle, the body flange 104 is aligned with the body 12 (e.g. the lower edge of a pickup truck bed) and secured to the body 12 at the attachment points 105 using fasteners, such as bolts, machine screws, or the like. In embodiments which include one or more hitch mounts 108 or frame mounts 118, the bumper beam 102 is fastened to the frame 14 at the hitch mounts 108 and/or frame mounts 118. In embodiments which include a cladding 116, one or more pieces of cladding are then attached to the bumper beam 102.

In operation, the bumper assembly 100 serves to absorb and/or transmit impact forces into the body 12 and frame 14 of the vehicle 10. Minor impacts are distributed across a broad impact zone, thereby reducing the likelihood of cracking. Loads applied to the bumper beam 102 are supported by the attachment points 105, contact structures 106, hitch mounts 108, and/or frame mounts 118. In preferred embodiments, the attachment points 105 and contact structures 106 are distributed across the body 12 and frame 14, respectively, of the vehicle 10, which may increase the likelihood that the assembly 100 remains in place even after cracks develop.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. A bumper assembly for attachment to a vehicle having a body and a frame, the bumper assembly comprising:
    an elongate bumper beam;
    at least one upwardly extending body flange disposed along at least a portion of the length of the bumper beam, the at least one body flange configured to overlie the body of the vehicle and adapted to attach and connect the bumper beam to the body of the vehicle; and
    at least one contact structure disposed on an inner surface of the bumper beam for contacting a portion of the frame of the vehicle.

2. The bumper assembly of claim 1, wherein the at least one body flange is integral to the bumper beam.

3. The bumper assembly of claim 1, further comprising at least one attachment point disposed on the body flange, for attaching of the body flange to the body of the vehicle.

4. The bumper assembly of claim 3, wherein the at least one attachment point on the body flange forms the primary attachment point between the bumper assembly and the vehicle.

5. The bumper assembly of claim 1, wherein the at least one body flange extends along an opening in the body of the vehicle, when the bumper assembly is attached to the vehicle.

6. The bumper assembly of claim 1, wherein the at least one body flange protects the body from wear or corrosion, when the bumper assembly is attached to the vehicle.

7. The bumper assembly of claim 1, wherein the at least one body flange bridges a gap between the frame and the body of the vehicle, when the bumper assembly is attached to the vehicle.

8. The bumper assembly of claim 1, wherein the at least one body flange extends across at least 50% of the length of the bumper beam.

9. The bumper assembly of claim 1, wherein the at least one body flange extends across to least 80% of the length of the bumper beam.

10. The bumper assembly of claim 1, wherein the at least one contact structure prevents rotation of the bumper, when the bumper assembly is attached to the vehicle.

11. The bumper assembly of claim 1, wherein the portion of the frame of the vehicle is a hitch beam.

12. The bumper assembly of claim 11, wherein the at least one contact structure includes at least one hitch mount for attachment of the at least one contact structure to the hitch beam.

13. The bumper assembly of claim 1, wherein the at least one contact structure comprises a first portion in contact with a hitch beam of the frame and a second portion in contact with a rear end of the frame.

14. The bumper assembly of claim 1, wherein the at least one contact structure comprises a top surface in contact with the frame for supporting a vertical load on the bumper beam when the bumper assembly is mounted to the vehicle.

15. The bumper of claim 1, wherein the at least one contact structure further comprises a bottom surface in contact with the frame for resisting rotational movement or vibration of the bumper beam when the bumper assembly is mounted to the vehicle.

16. The bumper assembly of claim 1, wherein the at least one contact structure is integral to the bumper beam.

17. The bumper assembly of claim 1, wherein the at least one contact structure includes a channel disposed on the inner surface of the bumper beam.

18. The bumper assembly of claim 1, wherein the at least one contact structure includes a plurality of closely-spaced projections extending outward from the bumper beam.

19. The bumper assembly of claim 1, wherein the at least one contact structure includes a plurality of closely spaced ribs extending outward from the bumper beam.

20. The bumper assembly of claim 1, wherein the at least one contact structure extends across at least 25% of the length of the bumper beam.

21. The bumper assembly of claim 1, wherein the at least one contact structure extends across at least 40% of the length of the bumper beam.

22. The bumper assembly of claim 1, wherein the at least one contact structure extends across at least 60% of the length of the bumper beam.

23. The bumper assembly of claim 1, further comprising at least one frame mount for attaching of the bumper beam to the frame of the vehicle.

24. The bumper assembly of claim 1, wherein the assembly further comprises a cladding having at least one cladding flange that extends from the cladding and is configured to overlie the body flange.

25. The bumper assembly of claim 1, wherein the bumper beam includes integral mounts for one or more sensors.

26. The bumper assembly of claim 1, wherein the bumper beam is constructed from a composite material.

27. The bumper assembly of claim 1, wherin the vehicle has a body on frame construction.

28. The bumper assembly of claim 1, wherein the vehicle has a unibody construction, such that the body and frame are of integral construction.

29. The bumper assembly of claim 1, wherein the bumper assembly is a rear bumper assembly.

30. A bumper assembly for attachment to a vehicle having a body and a frame, the bumper assemnly comprising:
    an elongate bumper beam;
    at least one contact structure disposed on an inner surface of the bumper bean for contacting a portion of the frame of the vehicle; and
    a cladding removably attached to the bumper to cover at least a portion of the bumper beam and having at least one cladding flange that extends upwardly from the cladding and if configured to overlie the body of the vehicle.

31. The bumper assembly of claim 30, further comprising at least one frame mount for attaching of the bumper beam to the frame of the vehicle.

32. The bumper assembly of claim 30, wherein the at least one cladding flange extends along an opening in the body of the vehicle, when the bumper assembly is attached to the vehicle.

33. The bumper assembly of claim 30, wherein the at least one cladding flange protects the body from wear or corrosion, when the bumper assembly is attached to the vehicle.

34. The bumper assembly of claim 30, wherein the at least one cladding flange bridges a gap between the frame and the body of the vehicle, when the bumper assembly is attached to the vehicle.

35. The bumper assembly of claim 30, wherein the at least one cladding flange extends across at least 50% of the length of the bumper beam.

36. The bumper assembly of claim 30, wherein the portion of the frame of the vehicle is a hitch beam.

37. The bumper assembly of claim 30 further comprising at least one body flange disposed along at least a portion of the length of the bumper beam, the at least one body flange configured to overlie the body of the vehicle and wherein said cladding flange covers at least a portion of the body flange.

38. The bumper assembly at claim 37 further comprising at least one attachment point disposed on the body flange for attaching the body flange to the body of the vehicle.

39. A bumper assembly for attachment to a vehicle having a body and a frame, the bumper assembly comprising:
    an elongate bumper beam;
    at least one body flange disposed along at least a portion of the lenght of the bumper beam, the at least one body flange configured to overlie the body of the vehicle;
    at least one contact structure disposed on an inner surface of the bumper beam for contacting a portion of the frame of the vehicle; and
    at least one attachment point disposed on the body flange for attaching the body flange to the body of the vehicle.

40. The bumper assembly of claim 39 wherein the at least one body flange is integral to the bumper beam.

* * * * *